(12) United States Patent
Toshimitsu

(10) Patent No.: US 11,130,227 B2
(45) Date of Patent: Sep. 28, 2021

(54) ROBOT CONTROL DEVICE, ROBOT, AND ROBOT SYSTEM

(71) Applicant: Seiko Epson Corporation, Tokyo (JP)

(72) Inventor: Shunsuke Toshimitsu, Azumino (JP)

(73) Assignee: Seiko Epson Corporation

( * ) Notice: Subject to any disclaimer, the term of this patent is extended or adjusted under 35 U.S.C. 154(b) by 258 days.

(21) Appl. No.: 16/137,647

(22) Filed: Sep. 21, 2018

(65) Prior Publication Data
US 2019/0091853 A1 Mar. 28, 2019

(30) Foreign Application Priority Data
Sep. 22, 2017 (JP) .............................. JP2017-182102

(51) Int. Cl.
*B25J 9/06* (2006.01)
*B25J 9/16* (2006.01)
*B25J 9/00* (2006.01)

(52) U.S. Cl.
CPC .............. *B25J 9/06* (2013.01); *B25J 9/0084* (2013.01); *B25J 9/1676* (2013.01); *G05B 2219/39096* (2013.01); *G05B 2219/49144* (2013.01)

(58) Field of Classification Search
CPC .................. B25J 11/0095; B25J 15/0014; B25J 15/0028; B25J 9/042; B25J 9/16; H01L 21/677; H01L 21/68707; Y10S 901/02; Y10S 901/17; Y10S 901/23; Y10S 901/32
See application file for complete search history.

(56) References Cited

U.S. PATENT DOCUMENTS

| 5,523,663 | A  | * | 6/1996 | Tsuge ...................... | B25J 9/162 318/568.16 |
| 7,021,173 | B2 | * | 4/2006 | Stoianovici ................ | B25J 9/06 74/490.03 |
| 7,395,606 | B2 | * | 7/2008 | Crampton .............. | G01B 11/03 33/503 |

(Continued)

FOREIGN PATENT DOCUMENTS

| DE | 10-2007-059480 A1 | 6/2009 |
| JP | 2017-087299 A | 5/2017 |

(Continued)

OTHER PUBLICATIONS

Extended European Search Report for Application No. EP 18 19 5664 dated May 24, 2019 (11 pages).

*Primary Examiner* — Bhavesh V Amin
(74) *Attorney, Agent, or Firm* — Harness, Dickey & Pierce, P.L.C.

(57) ABSTRACT

A robot control device that controls a robot including an A arm that is rotatable about an A rotation axis, a B arm that is provided so as to be rotatable around a B rotation axis with respect to the A arm and allowed to be brought into a first state overlapping with the A arm when viewed from an axial direction of the B rotation axis, a C arm that is provided so as to be rotatable around a C rotation axis which is an axial direction intersecting with an axial direction of the B rotation axis with respect to the B arm, the robot control device comprising: a processor, wherein the processor is configured to suppress interference between an object and the B arm by limiting a rotation range of the C arm in a case where the object is attached to the C arm.

12 Claims, 10 Drawing Sheets

(56) References Cited

U.S. PATENT DOCUMENTS

| | | | | |
|---|---|---|---|---|
| 7,664,570 B2* | 2/2010 | Suita | | B25J 9/1666 700/245 |
| 7,765,031 B2* | 7/2010 | Nagamatsu | | B25J 9/1666 700/255 |
| 8,583,285 B2* | 11/2013 | Aurnhammer | | B25J 9/1674 700/255 |
| 9,037,293 B2* | 5/2015 | Gomi | | B25J 9/1651 700/245 |
| 9,037,295 B2* | 5/2015 | Hodgson | | B25J 13/025 700/255 |
| 9,333,649 B1* | 5/2016 | Bradski | | G06K 9/00201 |
| 9,505,128 B1* | 11/2016 | Kesil | | B25J 9/163 |
| 9,616,564 B2* | 4/2017 | Pfaff | | B25J 9/1666 |
| 9,789,610 B1* | 10/2017 | Watts | | B25J 9/1666 |
| 10,060,857 B1* | 8/2018 | Bouchard | | B25J 9/0096 |
| 10,099,364 B2* | 10/2018 | Miyasaka | | B25J 9/047 |
| 10,293,479 B2* | 5/2019 | Yoshimura | | B25J 9/047 |
| 10,562,196 B2* | 2/2020 | Miyasaka | | B25J 19/0029 |
| 10,569,428 B2* | 2/2020 | Miyasaka | | B25J 18/007 |
| 10,661,453 B2* | 5/2020 | Koenig | | G16H 40/63 |
| 2003/0221504 A1* | 12/2003 | Stoianovici | | B25J 9/102 74/490.04 |
| 2004/0128026 A1* | 7/2004 | Harris | | A61B 34/76 700/245 |
| 2004/0249508 A1* | 12/2004 | Suita | | B25J 9/1666 700/245 |
| 2005/0234327 A1* | 10/2005 | Saracen | | A61B 6/548 600/407 |
| 2006/0052901 A1* | 3/2006 | Nihei | | B25J 9/1674 700/245 |
| 2009/0228145 A1* | 9/2009 | Hodgson | | A61B 17/1757 700/258 |
| 2013/0012959 A1* | 1/2013 | Jinno | | A61B 34/37 606/130 |
| 2014/0067120 A1* | 3/2014 | Gomi | | B25J 9/1638 700/254 |
| 2015/0266185 A1* | 9/2015 | Sekine | | B25J 9/046 74/490.01 |
| 2015/0375394 A1* | 12/2015 | Hodgson | | A61B 17/1764 700/160 |
| 2016/0288339 A1* | 10/2016 | Akaha | | B25J 9/046 |
| 2016/0288340 A1* | 10/2016 | Akaha | | B25J 9/0009 |
| 2016/0288341 A1* | 10/2016 | Akaha | | B25J 5/02 |
| 2016/0311107 A1* | 10/2016 | Yoshimura | | B25J 9/0018 |
| 2016/0318180 A1* | 11/2016 | Miyasaka | | B25J 9/0018 |
| 2016/0346923 A1* | 12/2016 | Kesil | | B25J 9/1612 |
| 2017/0021495 A1* | 1/2017 | Davis | | B25J 9/1005 |
| 2017/0120458 A1* | 5/2017 | Akaha | | B25J 9/0018 |
| 2017/0143429 A1* | 5/2017 | Richmond | | A61B 34/25 |
| 2017/0259434 A1* | 9/2017 | Takeda | | B21D 43/052 |
| 2017/0273748 A1* | 9/2017 | Hourtash | | A61B 34/74 |
| 2018/0001487 A1* | 1/2018 | Miyasaka | | B25J 18/04 |
| 2018/0079090 A1* | 3/2018 | Koenig | | A61B 1/00149 |
| 2018/0182658 A1 | 6/2018 | Goto et al. | | |
| 2018/0326598 A1* | 11/2018 | Miyasaka | | B25J 9/047 |
| 2018/0361567 A1* | 12/2018 | Akaha | | B25J 9/0018 |
| 2019/0001504 A1* | 1/2019 | Kogan | | B25J 9/1676 |
| 2019/0091853 A1* | 3/2019 | Toshimitsu | | B25J 9/1676 |

FOREIGN PATENT DOCUMENTS

| | | |
|---|---|---|
| JP | 2017-087302 A | 5/2017 |
| WO | WO-2016-189565 A1 | 12/2016 |

* cited by examiner

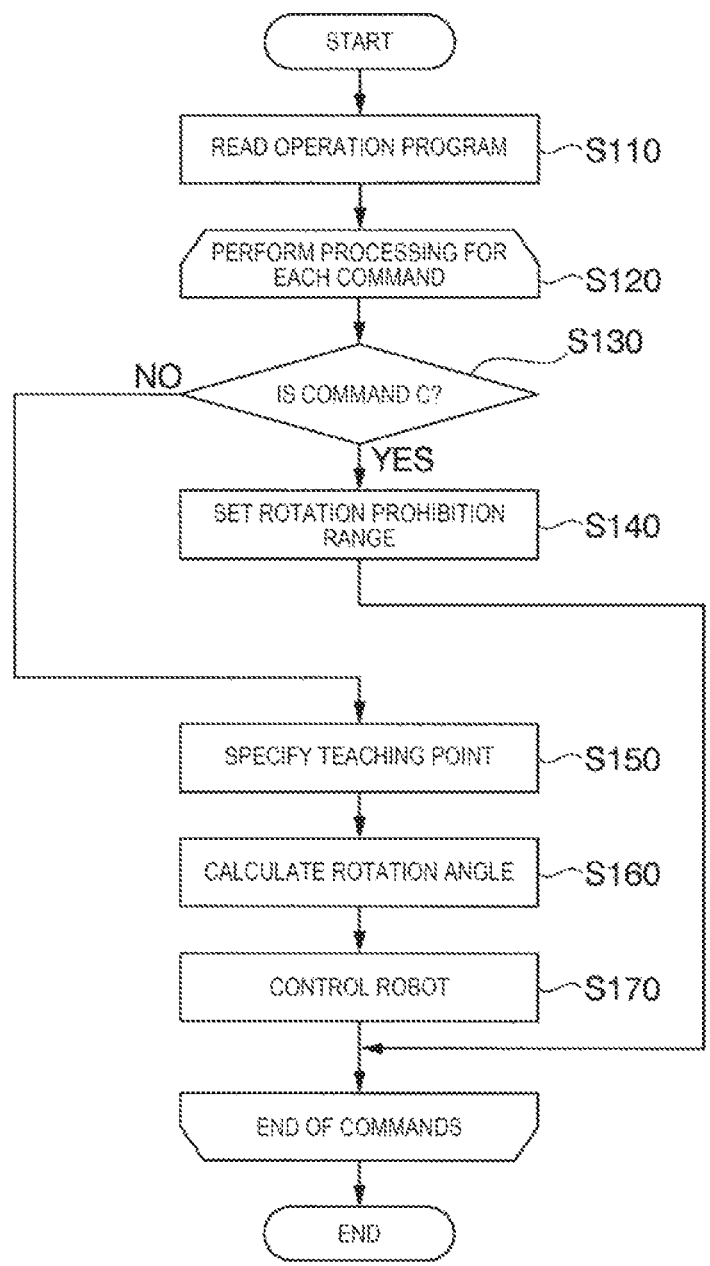

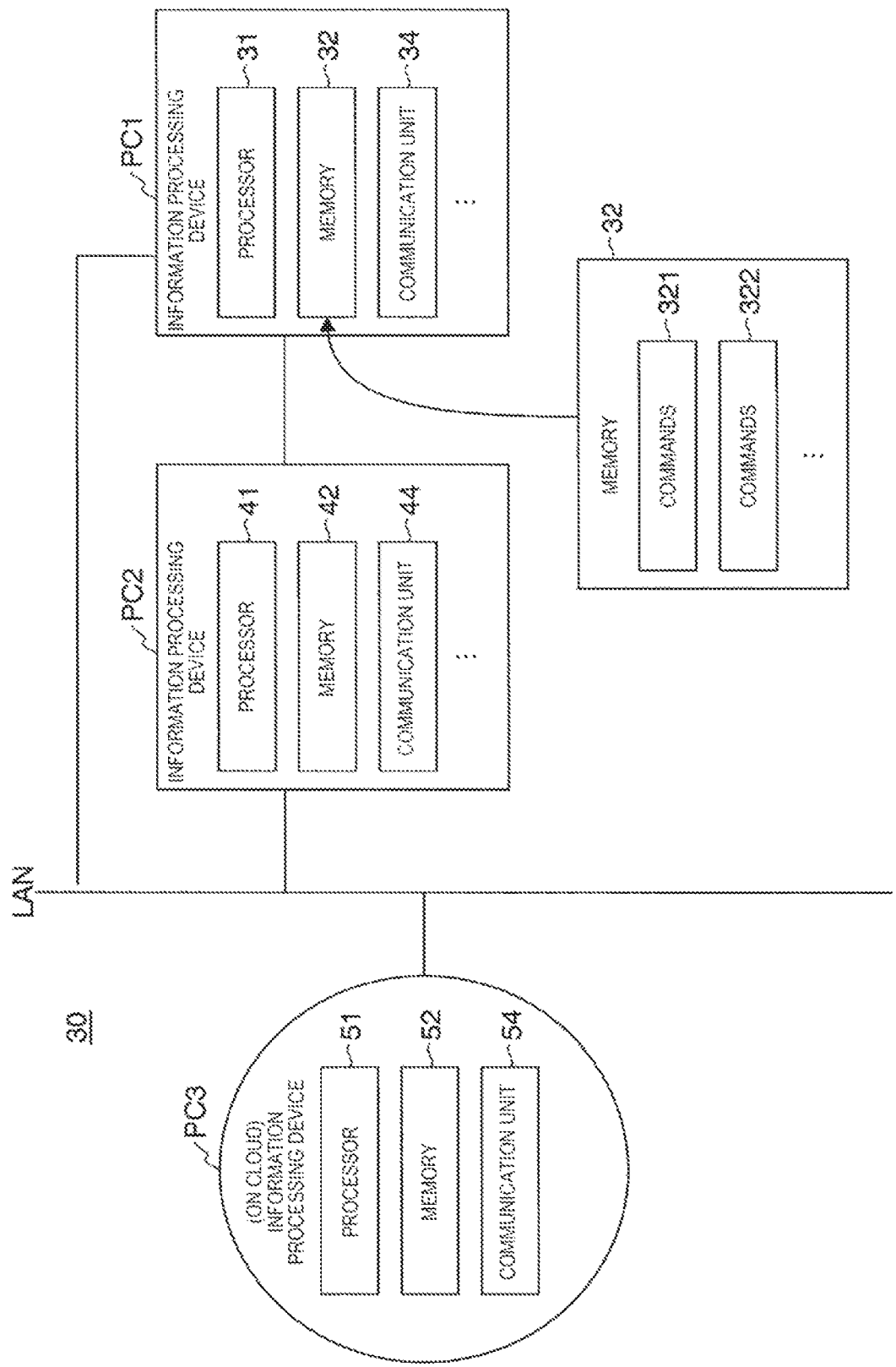

ROBOT CONTROL DEVICE, ROBOT, AND ROBOT SYSTEM

BACKGROUND

1. Technical Field

The present invention relates to a robot control device, a robot, and a robot system.

2. Related Art

Research and development of technologies that allow robots to perform predetermined work are being conducted.

In relation to this technology, there is known a robot which includes a base and a robot arm including a first arm provided on the base and is rotatable around a first rotation axis and a second arm provided on the first arm and is rotatable around a second rotation axis which is different from the first rotation axis in an axial direction, and in which the first arm and the second arm can overlap when viewed from an axial direction of the second rotation axis and a length in a height direction of a placement portion on which a target object can be placed by the robot arm or an end effector provided in the robot arm is 3.2 times or more the distance between the placement portion and the first rotation axis (see JP-A-2017-87299).

However, in such a robot, in a case where another object such as a control device for controlling an end effector is attached to the robot arm, the object and the robot arm may interfere with each other accompanying the movement of the robot arm in some cases.

SUMMARY

An aspect of the invention is directed to a robot control device that controls a robot including an A arm that is rotatable about an A rotation axis, a B arm that is provided so as to be rotatable around a B rotation axis with respect to the A arm and allowed to be brought into a first state overlapping with the A arm when viewed from an axial direction of the B rotation axis, a C arm that is provided so as to be rotatable around a C rotation axis which is an axial direction intersecting with an axial direction of the B rotation axis with respect to the B arm and includes a control unit that is able to limit a rotation range of the C arm.

With this configuration, the robot control device can suppress interference between the object and the robot accompanying the rotation of the C arm in a case where any object is attached to the C arm.

In another aspect of the invention, the robot control device may be configured such that the control unit limits a rotation range of the C arm in an operation including a first state and does not limit the rotation range of the C arm in an operation not including the first state.

With this configuration, the robot control device can suppress interference between the object and the robot accompanying the rotation of the C arm in the case where any object is attached to the C arm which is the rotation in the operation including the first state.

In another aspect of the invention, the robot control device may be configured such that the control unit sets the rotation range of the C arm in the operation including the first state and the rotation range of the C arm in the operation not including the first state to be different rotation ranges.

With this configuration, the robot control device can set the rotation range of the C-arm in the operation including the first state to a rotation range different from the rotation range of the C-arm in the operation not including the first state, and therefore it is possible to suppress the interference between the object and the robot accompanying the rotation of the C arm in the case where any object is attached to the C arm.

Another aspect of the invention is directed to a robot that is controlled by the robot control device described above.

With this configuration, the interference between the object and the robot accompanying the rotation of the C arm can be suppressed in the case where any object is attached to the C arm.

Another aspect of the invention is directed to a robot system that includes the robot control device described above and a robot controlled by the robot control device.

With this configuration, the robot system can suppress the interference between the object and the robot accompanying the rotation of the C arm in the case where any object is attached to the C arm.

Another aspect of the invention is directed to a robot control device that controls a robot including an A arm that is rotatable about an A rotation axis, a B arm that is provided so as to be rotatable around a B rotation axis with respect to the A arm and allowed to be brought into a first state overlapping with the A arm when viewed from an axial direction of the B rotation axis, a C arm that is provided so as to be rotatable around a C rotation axis which is an axial direction intersecting with an axial direction of the B rotation axis with respect to the B arm and includes a processor, and the processor is configured to execute a command for limiting a rotation range of the C arm.

With this configuration, the robot control device can suppress the interference between the object and the robot accompanying the rotation of the C arm in the case where any object is attached to the C arm.

BRIEF DESCRIPTION OF THE DRAWINGS

The invention will be described with reference to the accompanying drawings, wherein like numbers reference like elements.

FIG. 10 is a flowchart illustrating an example of a flow of processing performed by the robot control device.

FIG. 11 is an example of a hardware configuration of the robot control device in a case where the robot control device is configured by a plurality of information processing devices.

DESCRIPTION OF EXEMPLARY EMBODIMENTS

Embodiment

Figure 1:
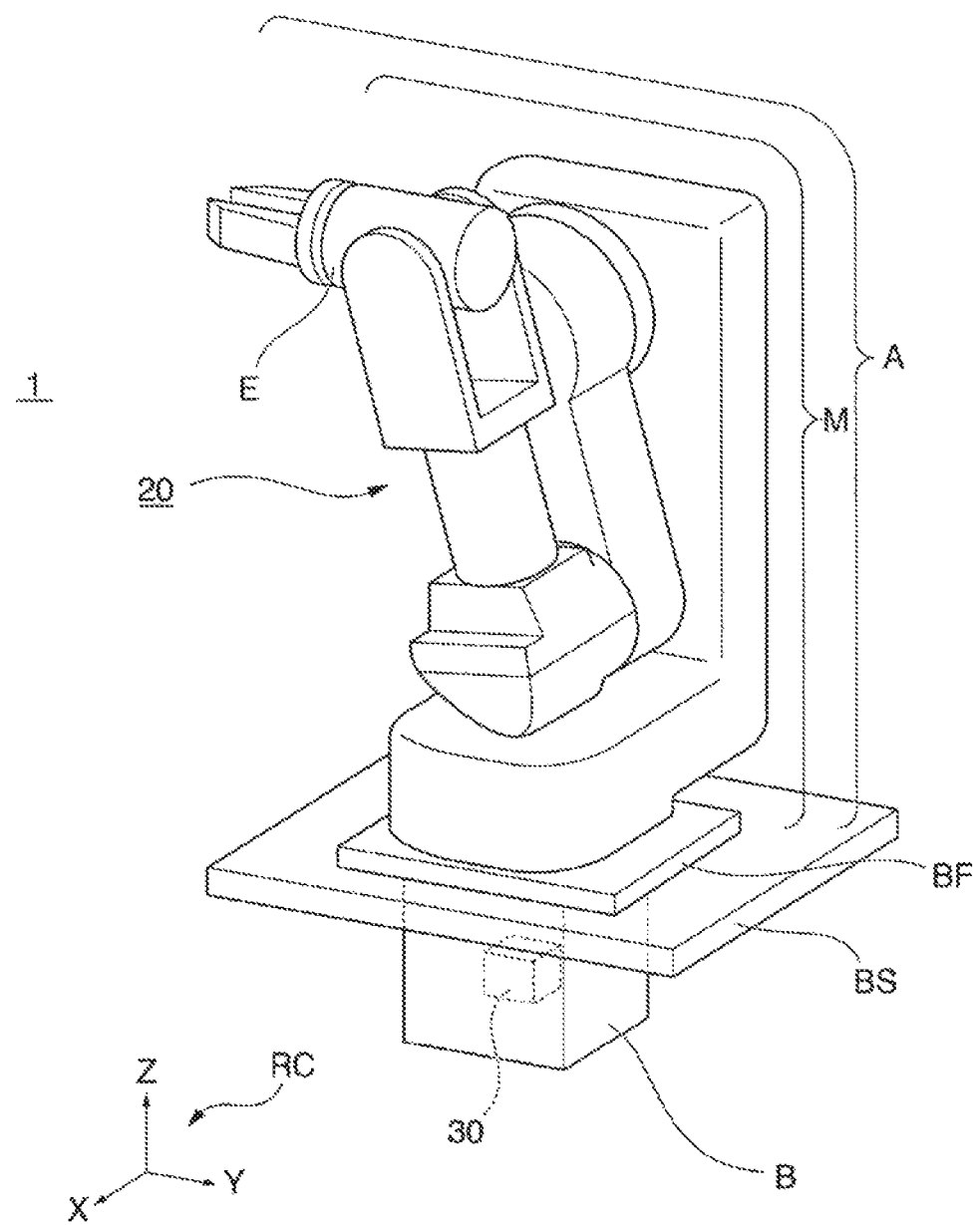
FIG. 1 is a diagram illustrating an example of a configuration of a robot system according to an embodiment.
Figure 2:
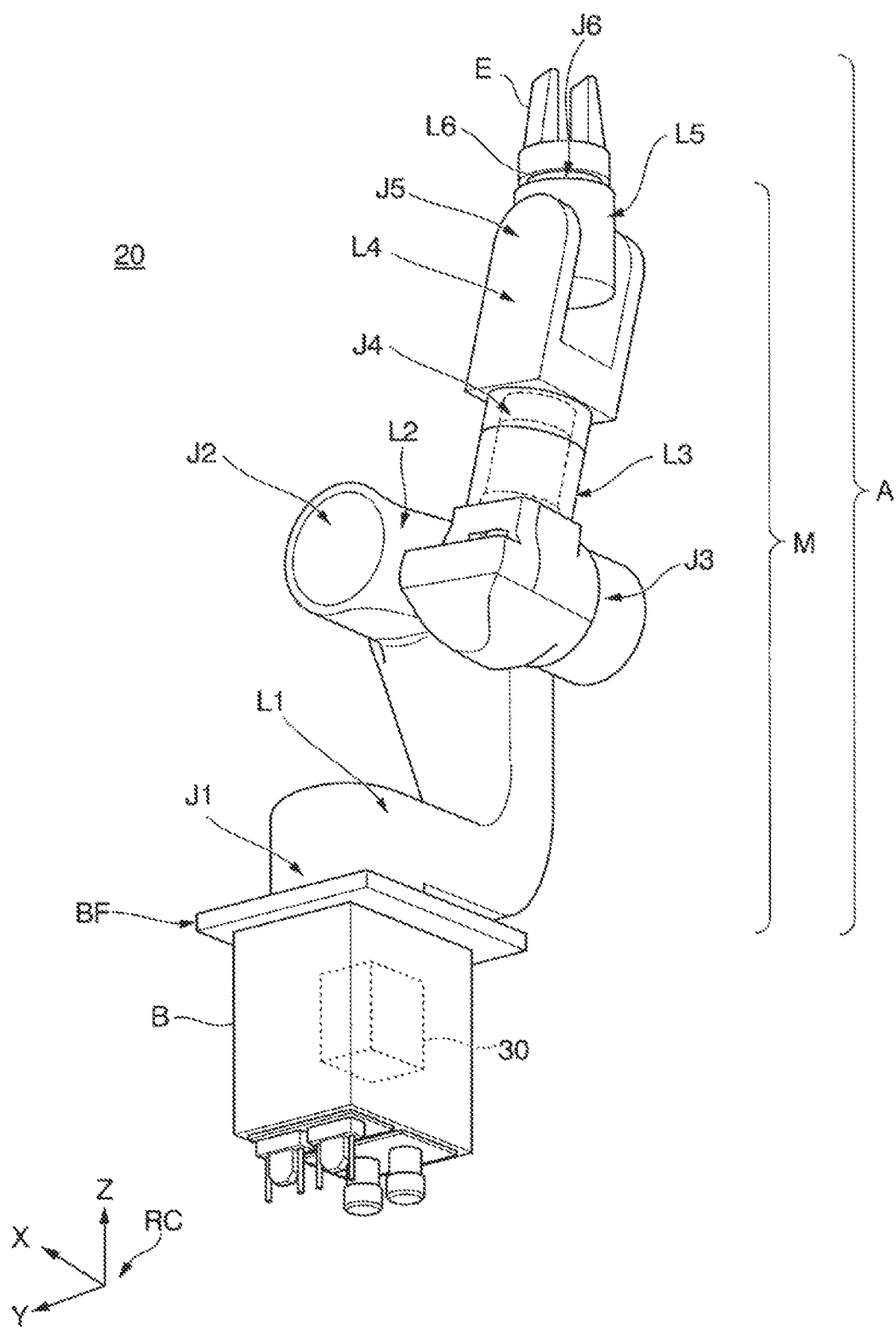
FIG. 2 is a diagram illustrating an example of a configuration of a robot.

In the following, embodiments of the invention will be described with reference to the drawings.
Configuration of Robot System First, a configuration of a robot system 1 will be described with reference to FIGS. 1 to 6. FIG. 1 is a diagram illustrating an example of a configuration of the robot system 1 according to the embodiment. The robot system 1 includes, for example, a robot 20. The robot system 1 may have a configuration in which other devices such as an imaging unit (for example, a camera separate from the robot 20 and a teaching device for teaching the robot 20 a desired operation to be performed by the robot 20) are included, in addition to the robot 20. FIG. 2 is a diagram illustrating an example of the configuration of the robot 20.

In the following, for the sake of convenience of explanation, a direction of gravity (vertically downward direction) will be referred to as a downward direction or downward, and a direction opposite to the downward direction will be referred to as an upward direction or upward. Further, in the following, as an example, a case where the downward direction coincides with the negative direction of the Z-axis in the robot coordinate system RC of the robot 20 will be described. A configuration in which the downward direction does not coincide with the negative direction may be adopted.

The robot 20 is a single arm robot including a base B, a movable portion A supported by the base B, and a robot control device 30. The single-arm robot is a robot including one arm like the movable portion A in this example. The robot 20 may be a multi-arm robot instead of the single-arm robot. The multi-arm robot is a robot including two or more arms (for example, two or more movable portions A). Among the multi-arm robots, a robot including two arms is also called a dual-arm robot. That is, the robot 20 may be a dual arm robot including two arms or the multi-arm robot having three or more arms (for example, three or more movable portions A).

The shape of the base B is, for example, a substantially rectangular parallelepiped shape of which longitudinal direction is along the vertical direction. The base B is hollow. One of the surfaces of the base B is provided with a flange BF. The movable portion A is provided on the flange BF. That is, the base B supports the movable portion A by the flange BF. The shape of the base B may be other shapes such as a cubic shape, a cylindrical shape, a polyhedron shape, and the like as long as it can support the movable portion A, instead of the shape as described above. The base B may have a configuration in which the flange BF is not provided.

In the following, for convenience of explanation, description will be made in such a way that a surface of the base B on which a flange BF is provided is referred to as an upper surface, and a surface of the base B on the side opposite to the surface on which the flange BF is provided is referred to as a lower surface. The base B is installed, for example, on an installation surface BS. The installation surface BS may be any surface as long as the surface on which the base B can be set, for example, a floor surface, a wall surface, a ceiling surface, an upper surface of a jig, or the like. In the following, as an example, description will be made on a case where the installation surface BS is parallel to the XY plane which is the plane extended by the X-axis and the Y-axis in the robot coordinate system RC. The installation surface BS may be non-parallel to the XY plane.

Here, an opening (not illustrated) penetrating in the vertical direction and allowing the base B to be inserted into the space (for example, space under the floor) below the installation surface BS is formed on the installation surface BS. The opening is smaller than the flange BF. A user can install (attach) the base B to the installation surface BS by fixing the flange BF and the installation surface BS with a plurality of bolts. That is, a plurality of through-holes into which the plurality of bolts are respectively inserted are formed in each of the flange BF and the installation surface BS. Another method of fixing the flange BF and the installation surface BS may be adopted. In this case, the installation surface BS may have a configuration in which the opening is not formed.

The movable portion A includes a manipulator M and an end effector E.

The manipulator M includes a first arm L1 to a sixth arm L6 which are six arms (links) and a joint J1 to a joint J6 which are six joints. The base B and the first arm L1 are connected by the joint J1. The first arm L1 and the second arm L3 are connected by the joint J2. The second arm L2 and the third arm L3 are connected by the joint J3. The third arm L3 and the fourth arm L4 are connected by the joint J4. The fourth arm L4 and the fifth arm L5 are connected by the joint J5. The fifth arm L5 and the sixth arm L6 are connected by the joint J6. That is, the movable portion A including the manipulator M is a six-axis vertical articulated arm. The movable portion A may be configured to operate with a degree of freedom of 5 axes or less or operate with a degree of freedom of 7 axes or more. The second arm L2 is an example of the A arm. In this case, the third arm L3 is an example of the B arm and the fourth arm L4 is an example of the C arm.

The joint J1 is a joint for which counterclockwise in a case of viewing the joint J1 downward is positive and clockwise in the case is negative and which can rotate 360 degrees or more in the positive and negative directions from a reference position in the rotation of the joint J1. In the following, as an example, description will be made on a case where the joint J1 is a joint that can rotate 360 degrees in each of the positive and negative directions. The joint J1 may be a joint that can rotate by less than 360 degrees instead of the joint that can rotate 360 degrees.

The joint J2 is a joint for which counterclockwise in a case of viewing the joint J2 in a direction from the third arm L3 toward the second arm L2 among two directions along a second rotation axis AX2 is positive and clockwise in the case is negative and which can rotate 360 degrees in the positive and negative directions from a reference position in the rotation of the joint J2. In the following, as an example, description will be made on a case where the joint J2 is a joint rotatable by 360 degrees in each of the positive and negative directions. The joint J2 may be a joint that can rotate by less than 360 degrees instead of the joint that can rotate 360 degrees.

The joint J3 is a joint for which counterclockwise in a case of viewing the joint J3 in a direction from the third arm L3 toward the second arm L2 among two directions along a third rotation axis AX3 is positive and clockwise in the case is negative and which can rotate 360 degrees or more in the positive and negative directions from a reference position in the rotation of the joint J3. In the following, as an example, description will be made on a case where the joint J3 is a joint rotatable by 360 degrees in each of the positive and negative directions. The joint J3 may be a joint that can rotate by less than 360 degrees instead of the joint that can rotate 360 degrees.

The joint J4 is a joint for which counterclockwise in a case of viewing the joint J4 in a direction from the fourth arm L4 toward the third arm L3 among two directions along a fourth rotation axis AX4 is positive and clockwise in the case is negative and which can rotate 360 degrees or more in the positive and negative directions from a reference position in the rotation of the joint J4. In the following, as an example, description will be made on a case where the joint J4 is a joint rotatable by 360 degrees in each of the positive and negative directions. The joint J4 may be a joint that can rotate by less than 360 degrees instead of the joint that can rotate 360 degrees.

The joint J5 is a joint for which counterclockwise in a case of viewing the joint J5 in a direction from the third arm L3 toward the second arm L2 among two directions along the third rotation axis AX3 is positive and clockwise in the case is negative and which can rotate 125 degrees in the positive and negative directions from a reference position in the rotation of the joint J5. The joint J5 may be a joint that can rotate by an angle smaller than 125 degrees in each of the positive and negative directions, or may be a joint that can rotate by an angle greater than 125 degrees in each of the positive and negative directions.

The joint J6 is a joint for which counterclockwise in a case of viewing the joint J6 in a direction from an end effector E toward the sixth arm L6 among two directions along a sixth rotation axis AX6 is positive and clockwise in the case is negative and which can rotate 360 degrees or more in the positive and negative directions from a reference position in the rotation of the joint J6. In the following, as an example, description will be made on a case where the joint J6 is a joint rotatable by 360 degrees in each of the positive and negative directions. The joint J6 may be a joint that can rotate by less than 360 degrees instead of the joint that can rotate 360 degrees.

In each of FIG. 1 and FIG. 2, in order to simplify the drawing, configurations of an actuator, an encoder, a reduction gear, a brake, and the like provided in each of the joints J1 to J6 are omitted. The brake may be an electromagnetic brake or a mechanical brake. Some or all of the joints J1 to J6 may be configured not to include the reduction gear. Some or all of the joints J1 to J6 may be configured not to include a brake.

The first arm L1 is rotatable around a first rotation axis AX1 (see, for example, FIG. 3) which is a rotation axis of the joint J1 with respect to the base B. The second arm L2 is rotatable around the second rotation axis AX2 (see, for example, FIG. 3) which is the rotation axis of the joint J2 with respect to the first arm L1. The third arm L3 is rotatable around the third rotation axis AX3 (see, for example, FIG. 3) which is the rotation axis of the joint J3 with respect to the second arm L2. The fourth arm L4 is rotatable around the fourth rotation axis AX4 (see, for example, FIG. 3) which is the rotation axis of the joint J4 with respect to the third arm L3. The fifth arm L5 is rotatable around the fifth rotation axis AX5 (see FIG. 3, for example) which is the rotation axis of the joint J5 with respect to the fourth arm L4. The sixth arm L6 is rotatable around the sixth rotation axis AX6 (see, for example, FIG. 3) which is the rotation axis of the joint J6 with respect to the fifth arm L5.

Figure 3:
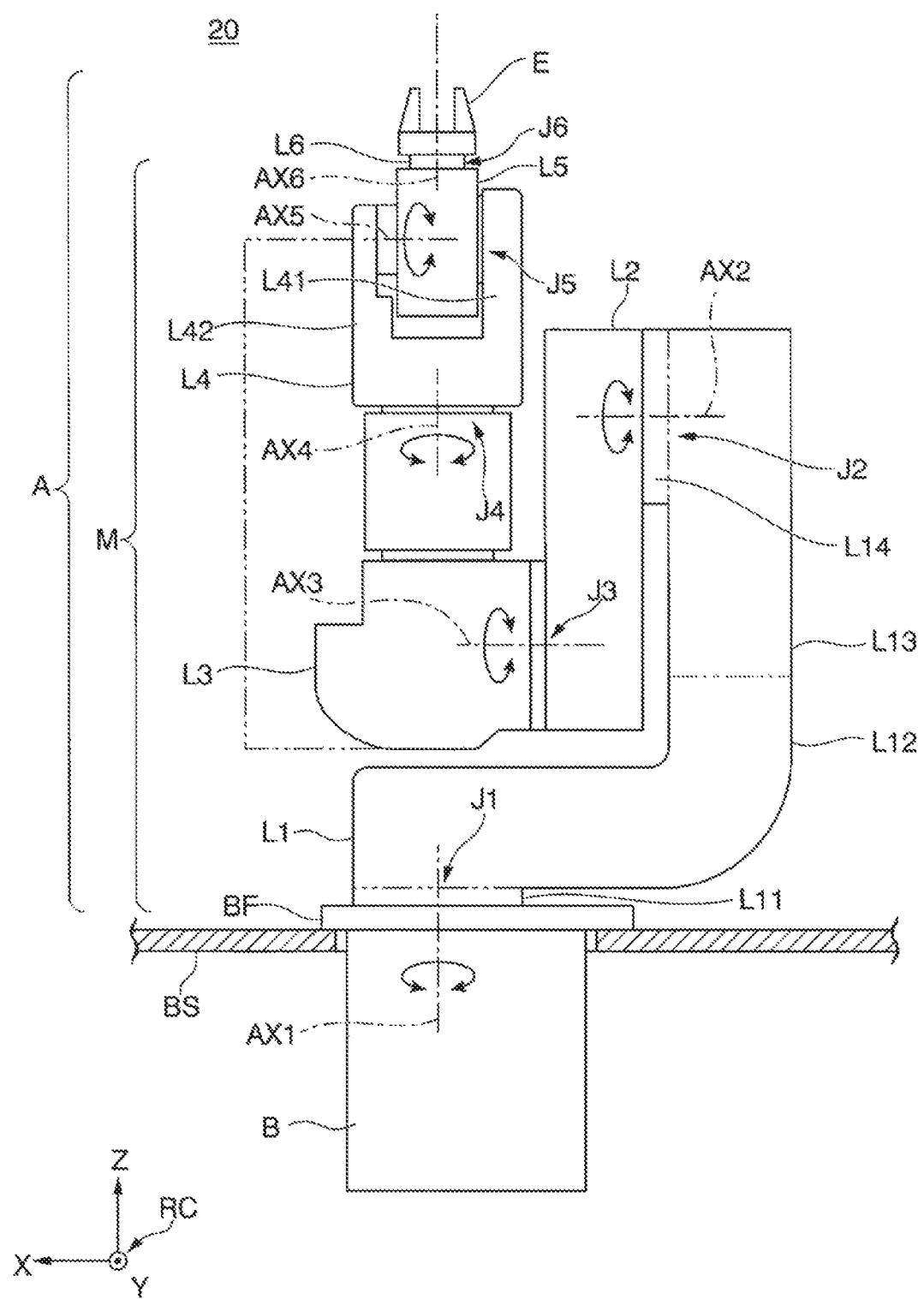
FIG. 3 is a diagram illustrating an example of the robot when viewed in the negative direction of the Y-axis in a robot coordinate system in a case where a second rotation axis is parallel to the X-axis in a robot coordinate system and a joint is positioned on the negative direction side of the X-axis with respect to the joint axis.
Figure 4:
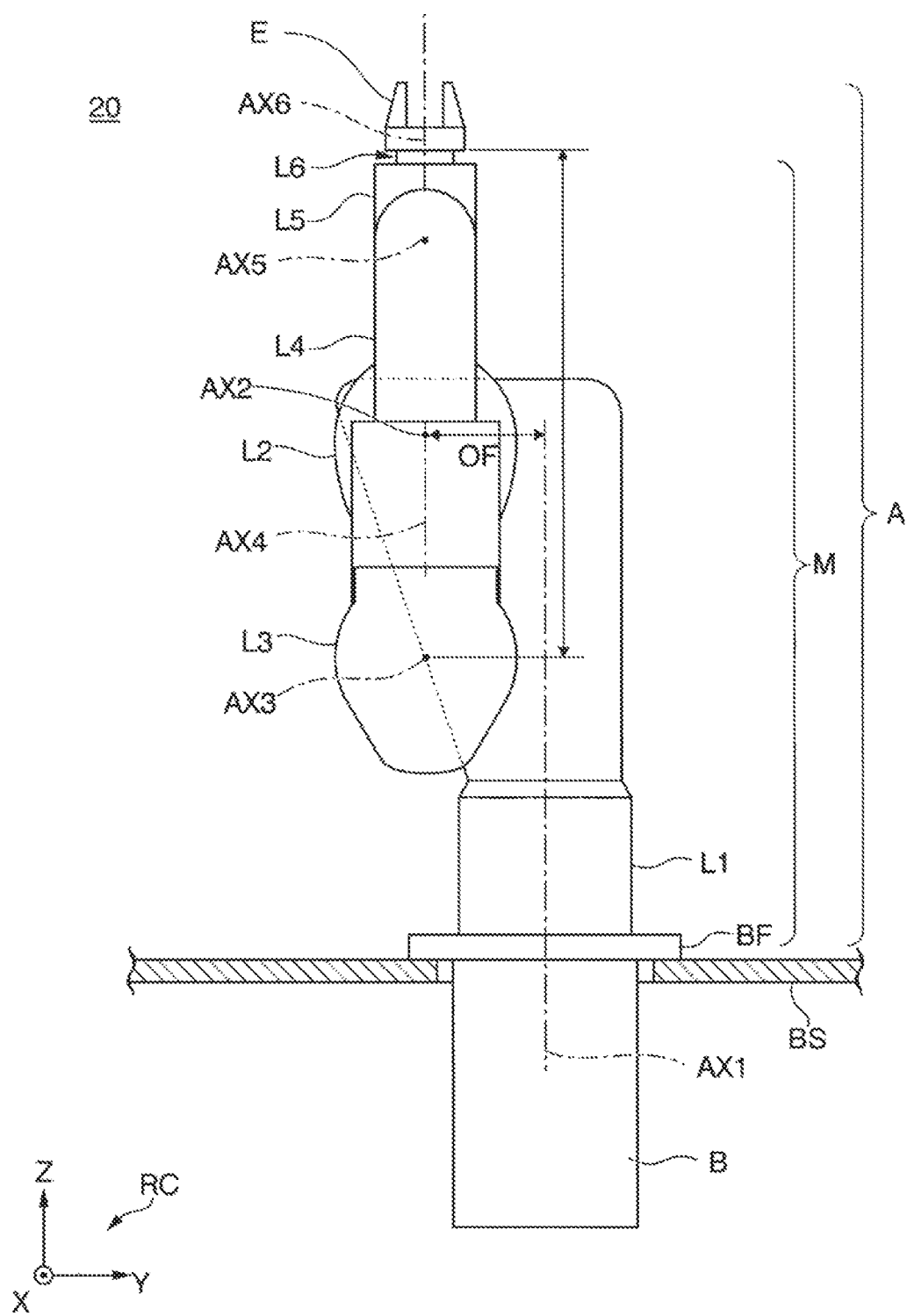
FIG. 4 is a diagram illustrating an example of the robot when the robot illustrated in FIG. 3 is viewed in the negative direction of the X-axis in the robot coordinate system.

Here, the manipulator M will be described in more detail with reference to FIGS. 3 to 6. FIG. 3 is a diagram illustrating an example of the robot 20 when viewed in the negative direction of the Y-axis in the robot coordinate system RC in a case where the second rotation axis AX2 is parallel to the X-axis in the robot coordinate system RC and the joint J2 is positioned on the negative direction side of the X-axis of the joint axis J1 with respect to the joint axis J1. FIG. 4 is a diagram illustrating an example of the robot 20 when the robot 20 illustrated in FIG. 3 is viewed in the negative direction of the X-axis in the robot coordinate system RC.

As illustrated in FIG. 3 and FIG. 4, since the direction from the upper surface of the base B to the lower surface of the base B coincides with the downward direction, the joint J2 is positioned above the joint J1.

The joint J2 is not positioned on the extension of the first rotation axis AX1. This is because, as illustrated in FIG. 3, the shape of the first arm L1 is a bent shape in a case where the robot 20 is viewed in the negative direction of the Y-axis in the robot coordinate system RC. In this example, the shape of the first arm L1 is a shape rounded and curved almost in L-shape in a case where the robot 20 is viewed toward the negative direction of the Y-axis in the robot coordinate system RC. Specifically, the first arm L1 is configured by four portions L11 to L14. The portion L11 is a portion extending upward from the base B along the first rotation axis AX1 among the four portions that configure the first arm L1 in FIG. 3. The portion L12 is a portion extending in the negative direction of the X-axis in the robot coordinate system RC from the upper end of the portion L11 among the four portions. The portion L13 is a portion extending upward from an end portion of the portion L12 on the side opposite to the portion L11 among the four portions. The portion L14 is a portion extending from an end portion of the portion L13 on the side opposite to the portion L12 in the positive direction of the X-axis, among the four portions. Here, the portions L11 to L14 may be formed as a single body to configure the first arm L1 or may be formed as separate bodies to configure the first arm L1. In FIG. 3, the portions L12 and L13 are substantially orthogonal in a case where the robot 20 is viewed in the negative direction of the Y-axis in the robot coordinate system RC.

Figure 5:
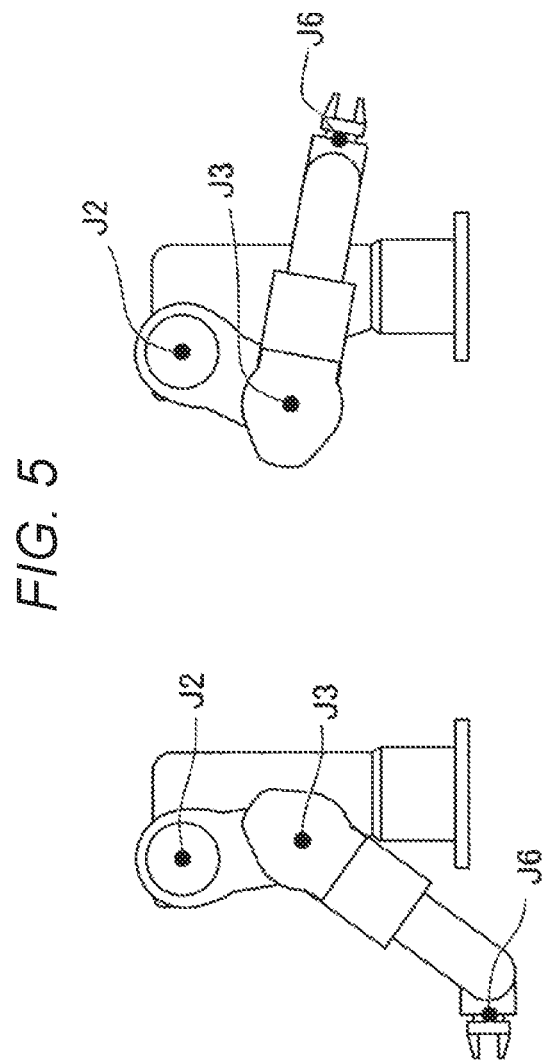
FIG. 5 is a diagram illustrating the difference in ease of occurrence of interference between a manipulator and a base when the robot rotates a joint in the positive or negative direction.

Also, the second rotation axis AX2 does not intersect the first rotation axis AX1. This is because, as illustrated in FIG. 4, the shape of the first arm L1 has a portion extending in the negative direction of the Y-axis in a case where the shape of the first arm L1 is viewed in the negative direction of the X-axis in the robot coordinate system RC. In the example illustrated in FIG. 4, the shape of the first arm L1 is a substantially rounded triangular shape in this case. The joint J2 is provided in the corresponding portion. For that reason, in the example illustrated in FIG. 4, in this case, the second rotation axis AX2 is distant from the first rotation axis AX1 by a distance OF toward the negative direction of the Y-axis in the robot coordinate system RC. With this, in a case where the robot 20 rotates the joint J3 in the positive direction of the joint J3 and rotates the third arm L3 around the third rotation axis AX3, it is possible to suppress interference between the manipulator M and the base B in the robot. As a result, in a case where the robot 20 rotates the joint J3 in the negative direction of the joint J3 described above to rotate the third arm L3 about the third rotation axis AX3, the manipulator M and the base B are likely to interfere with each other in the robot 20. FIG. 5 is a diagram illustrating the difference in ease of occurrence of interference between the manipulator M and the base B when the robot 20 rotates the joint J3 in the positive or negative direction. As illustrated in the left diagram of FIG. 5, in a case where the robot 20 rotates the joint J3 in the positive direction of the joint J3 to rotate the third arm L3 about the third rotation axis AX3, the position of the center of gravity of the joint J6 can be positioned below the base B in the robot 20. That is, in this case, in the left diagram, it can be understood that the robot 20 can suppress the interference between the manipulator M and the base B. On the other hand, as illustrated in the right diagram of FIG. 5, in a case where the robot 20 rotates the joint J3 in the negative direction of the joint J3 to rotate the third arm L3 about the third rotation axis AX3, the position of the center of gravity of the joint J6 cannot be positioned below the base B in the robot. That is, in this case, in the right diagram, it can be understood that the robot 20 makes the manipulator M and the base B easily interfere.

Description returns to FIG. 3 and FIG. 4. The shape of the second arm L2 is an elongated shape. The second arm L2 is connected to the tip end portion of the first arm L1, that is, an end portion of end portions of the portion L14 opposite to the portion L13.

The shape of the third arm L3 is an elongated shape. The third arm L3 is connected to an end portion of end portions of the second arm L2 opposite to the end portion connected to the first arm L1.

The fourth arm L4 is connected to the tip end portion of the third arm L3, that is, an end portion of end portions of the third arm L3 opposite to the end portion to which the second arm L2 is connected. On the fourth arm L4, a supporting portion L41 and a supporting portion L42 which are a pair of supporting portions opposed to each other are formed. The supporting portion L41 and the supporting portion L42 are used for connection with the fifth arm L5 of the fourth arm L4. That is, the fourth arm L4 positions the fifth arm L5 between the supporting portion L41 and the supporting portion L42, and is connected to the fifth arm L5 by the supporting portion L41 and the supporting portion L42. The fourth arm L4 is not limited to this, and may have a configuration (cantilever) that supports the fifth arm L5 by one supporting portion, and supports the fifth arm L5 with three or more supporting portions.

As described above, the fifth arm L5 is positioned between the supporting portion L41 and the supporting portion L42 and is connected to the supporting portion L41 and the supporting portion L42.

The shape of the sixth arm L6 is a flat plate shape. That is, the sixth arm L6 is a flange. The sixth arm L6 is connected to an end portion of end portions of the fifth arm L5 opposite to the fourth arm L4. In the sixth arm L6, the end effector E is connected to the corresponding end portion.

In this example, the second rotation axis AX2 and the third rotation axis AX3 are parallel. The third rotation axis AX3 and the fourth rotation axis AX4 intersect each other. In the examples illustrated in FIGS. 3 and 4, the third rotation axis AX3 and the fourth rotation axis AX4 are orthogonal to each other. The fourth rotation axis AX4 and the fifth rotation axis AX5 intersect each other. In this example, the fourth rotation axis AX4 and the fifth rotation axis AX5 are orthogonal to each other. Further, the fifth rotation axis AX5 and the sixth rotation axis AX6 intersect each other. In this example, the fifth rotation axis AX5 and the sixth rotation axis AX6 are orthogonal to each other.

Here, in the manipulator M, the first arm L1 and the second arm L2 can overlap when viewed from the axial direction of the second rotation axis AX2. In the present embodiment, matters that certain two arms overlap each other when the two arms are viewed from a certain direction mean that a ratio of an area where one arm of the two arms overlaps the other arm is equal to or more than a predetermined ratio. The predetermined ratio is, for example, 90%, but it is not limited thereto, and other ratios may be used.

In the manipulator M, the second arm L2 and the third arm L3 can overlap when viewed from the axial direction of the second rotation axis AX2. That is, in the manipulator M, the state of the manipulator M can be brought into a first state in which the second arm L2 and the third arm L3 overlap by rotating the joint J2. The state of the manipulator M illustrated in FIGS. 3 and 4 is an example of the first state.

The reason why the state of the manipulator M can be set to the first state is that the third arm L3 is formed in a shape and a size that do not interfere with the second arm L2 due to the rotation of the joint J2. For example, when the state of the manipulator M is the first state and the fourth rotation axis AX4 is parallel to the first rotation axis AX1, the length of the second arm L2 in the direction along the first rotation axis AX1 is longer than the length of the third arm L3.

Figure 6:
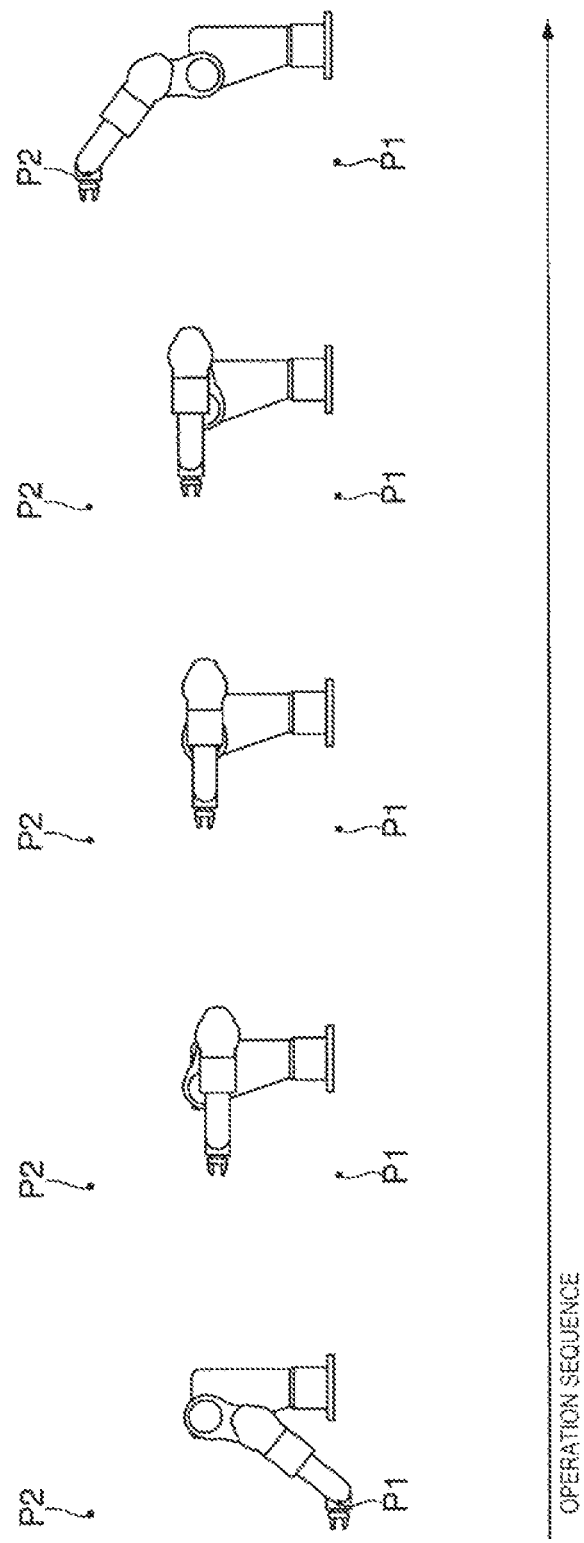
FIG. 6 is a diagram illustrating an example of an operation through a first state among operations that can be performed by the robot.

Since the state of the manipulator M can be set to the first state, the robot 20 can perform an operation through the first state. FIG. 6 is a diagram illustrating an example of the operation through the first state among operations that can be performed by the robot 20. A point P1 illustrated in FIG. 6 indicates a first position. The first position may be any position as long as it corresponds to a position that is lower than the installation surface BS on which the base B is installed and at which the end effector E reaches, when viewed from a direction orthogonal to the first rotation axis AX1. A point P2 illustrated in FIG. 6 indicates a second position. The second position may be any position as long as it corresponds to a position that is above the second rotation axis AX2 and that the end effector E reaches, when viewed from a direction orthogonal to the first rotation axis AX1. In the example illustrated in FIG. 6, the X-axis coordinate and the Y-axis coordinate in the robot coordinate system RC at the first position coincide with the X-axis coordinate and the Y-axis coordinate in the robot coordinate system RC at the second position. That is, in the operation illustrated in FIG. 6, the robot 20 moves the position (for example, represented by the position of the center of gravity of the end effector E) of the end effector E along a substantially straight line from the first position to the second position (from the bottom to the top in this example) by going through the first state. With this, the robot 20 can reduce the space provided for preventing a portion of the robot 20 from interfering with other objects. That is, the robot 20 can narrow the space between the robot 20 and a surrounding object.

Description returns to FIG. 2. The actuators respectively provided for the joints J1 to J6 of the manipulator M are communicably connected to a robot control device 30 by cables. With this, each of the actuators operates the manipulator M based on a control signal acquired from the robot control device 30. Wired communication via a cable is performed according to standards such as Ethernet (registered trademark) and universal serial bus (USB), for example. A configuration in which some or all of the actuators may be connected to the robot control device 30 by wireless communication performed according to a communication standard such as Wi-Fi (registered trademark) may be adopted.

The end effector E is an end effector that holds an object. In this example, the end effector E includes a finger portion, and holds the object by gripping the object by the finger portion. Instead of this, the end effector E may be configured to hold the object by lifting the object with suction of air, magnetic force, another jig, or the like. In this example, "holding" means to bring the object into a state where it is possible to lift the object.

The end effector E is communicably connected to the robot control device 30 by a cable. With this, the end effector E performs an operation based on the control signal acquired from the robot control device 30. Wired communication via a cable is performed according to standards such as Ethernet (registered trademark) and USB, for example. The end effector E may be configured to be connected to the robot control device 30 by wireless communication performed according to a communication standard such as Wi-Fi (registered trademark).

The robot control unit 30 is configured by at least one processor and at least one memory. In the robot control device 30, a configuration in which at the least one processor is provided in one information processing device may be adopted or a configuration in which at the least one processor is provided in a distributed manner in a plurality of information processing devices may be adopted. In the robot control device 30, a configuration in which at the least one memory is provided may be adopted or a configuration in which at the least one memory is provided in a distributed manner in a plurality of information processing devices may be adopted.

In the example illustrated in FIG. 11, the robot control device 30 is configured with a processor 31 which is one processor provided in an information processing device PC1 and a memory 32 which is one memory provided in the information processing device PC1. The information processing device PC1 may be configured to include another processor in addition to the processor 31, or may be configured to include another memory in addition to the memory 32.

The information processing device PC1 is, for example, a workstation, a desktop personal computer (PC), a notebook PC, a tablet PC, a multifunctional mobile phone terminal (smartphone), an electronic book reader with a communication function, a personal digital assistant (PDA).

The processor 31 is, for example, a central processing unit (CPU). The processor 31 may be another processor such as a field-programmable gate array (FPGA). The processor 31 executes various commands stored in the memory of the robot control device 30. The processor 31 executes various commands stored in a memory of another device.

The memory 32 includes, for example, a hard disk drive (HDD), a solid state drive (SSD), an electrically erasable programmable read-only memory (EEPROM), a read-only memory (ROM), a random access memory (RAM), and the like. That is, the memory 32 includes a temporary storage device and a non-transitory storage device. The memory 32 may be an external storage device connected by a digital input and output port such as a USB in place of the memory built in the information processing device PC1. The memory 32 stores various types of information to be processed by the processor 31 or the processor of another device, various commands (for example, programs and codes) executable by a computer such as commands 321 and 322, various images, and the like.

Each of the commands 321 and 322 is a portion of a plurality of commands (that is, a plurality of commands executable by the computer) to be executed by the processor 31 in order to allow the processor 31 to configure the robot control unit 30.

The robot control device 30 includes a communication unit 34 as a hardware function unit to communicate with other devices. The communication unit 34 is configured to include a digital input and output port such as USB, an Ethernet (registered trademark) port, and the like.

In this example, the robot control device 30 is provided inside (built in) the base B. The robot control device 30 may be provided separately from the robot 20, instead of being provided inside the base B. In this case, the robot system 1 includes at least the robot 20 and the robot control device 30 separate from the robot 20.

Here, the robot control device 30 controls the robot 20. More specifically, the robot control device 30 causes the robot 20 to perform an operation specified by an operation program based on, for example, the operation program stored in the memory 32 in advance by the user.

Outline of Processing Performed by the Robot Control Device when Operating Robot In the following, an outline of processing performed by the robot control device 30 when operating the robot 20 will be described.

As described above, the robot control device 30 causes the robot 20 to perform the operation designated by the operation program based on the operation program stored in the memory 32 in advance. In this case, the robot control device 30 specifies a plurality of teaching points specified by the operation program in an order determined in advance and calculates a rotation angle of each of the joints J1 to J6 in a case where the control point of the robot 20 coincides with the specified teaching point based on inverse kinematics.

Here, the control point of the robot 20 is a virtual point that moves together with the movable portion A of the robot 20, and is, for example, a tool center point (TCP). In the following, as an example, a case where the control point is set to a position of the center of gravity of the joint J6 will be described. A configuration in which the control point is set to another position of the movable portion A may be adopted. The position of the control point is represented by the position of the origin of the control point coordinate system which is a three-dimensional local coordinate system correlated with the position of the center of gravity. That is, the position of the origin coincides with the position of the center of gravity. Also, the origin moves with the center of gravity. The orientation of the control point is represented by a direction in the robot coordinate system RC of each coordinate axis in a control point coordinate system. A configuration in which the position and orientation of the control point are represented by other positions and orientation correlated with the movable portion A may be adopted.

Each of the plurality of teaching points designated by the operation program is a virtual point which is a target for the robot 20 to make the control point of the robot 20 coincide with the teaching point. The position and the orientation are correlated with each teaching point. In a case where the control point is made to coincide with a certain teaching point, the position and the orientation of the control point coincide with the position and the orientation of the teaching point.

Figure 7:
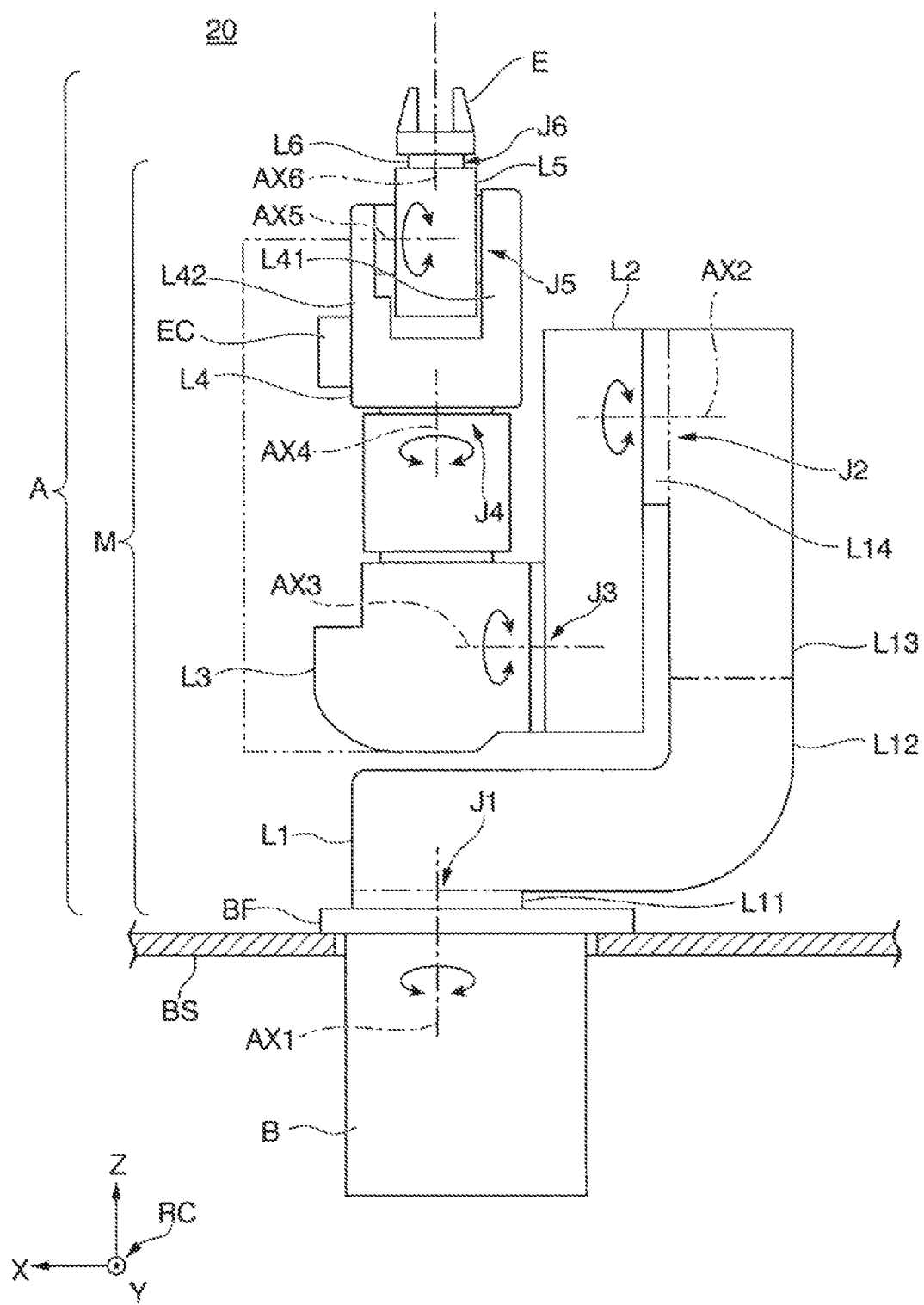
FIG. 7 is a diagram illustrating an example of a robot illustrated in FIG. 3 which is a robot in a case where an object is attached to a surface on the positive side of the X-axis in a robot coordinate system among surfaces of a fourth arm.

Here, the robot 20 can set the state of the manipulator M to the first state described above. In other words, the robot 20 can perform an operation including the first state. In the operation including the first state, in a case where another object EC is attached to the fourth arm L4 (more specifically, outer side of the fourth arm L4) as illustrated in FIG. 7, the object EC and the second arm L2 may interfere with each other in accordance with the rotation of the joint J4 (that is, rotation of the fourth arm L4) in the robot 20. The object EC may be any object, for example, another device such as a control device for controlling the end effector E, jigs, various wirings, various sensors, and the like. FIG. 7 is a diagram illustrating an example of the robot 20 illustrated in FIG. 3 which is the robot 20 in a case where the object EC is attached to a surface on the positive direction side of the X-axis in the robot coordinate system RC among surfaces of the fourth arm L4.

In order to suppress such interference between the object EC and the robot 20 (more specifically, second arm L2), the robot control device 30 can limit the rotation range of the joint J4 (that is, rotation range of the fourth arm L4). With this, the robot control device 30 can suppress the interference between the robot 20 and the object EC accompanying the rotation of the fourth arm L4 in a case where any object (in this example, object EC) is attached to the fourth arm L4.

In a case of causing the robot control device 30 to limit the rotation range of the joint J4, the user sets a rotation prohibition range which is the range for prohibiting the rotation of the joint J4 or a rotation permission range which is the range for permitting the rotation of the joint J4 in the robot control device 30 by the operation program. In the following, as an example, a case where the user sets (specifies) the rotation prohibition range in the robot control device 30 by the operation program will be described.

In a case where the rotation prohibition range is set, the robot control device 30 limits the rotation range of the joint J4 in the operation including the first state and does not limit the rotation range of the joint J4 in the operation not including the first state. That is, in this case, the rotation range (that is, rotation range of the fourth arm L4) of the joint J4 in the operation including the first state and the rotation range (that is, rotation range of the fourth arm L4) of the joint J4 in the operation not including the first state are different rotation ranges. With this, when the robot control device 30 causes the robot 20 to perform the operation including the first motion, the robot control device 30 can suppress the interference between the object EC and the robot 20 in a case where the object EC is attached to the fourth arm L4. In this case, the robot control device 30 may be configured to limit the rotation range of the joint J4 in both the operation including the first state and the operation not including the first state. In this case, the robot control device 30 may be configured to limit the rotation range of the joint J4 in an operation different from the operation including the first state and configured not to limit the rotation range of the joint J4 in operations other than the operation.

Figure 8:
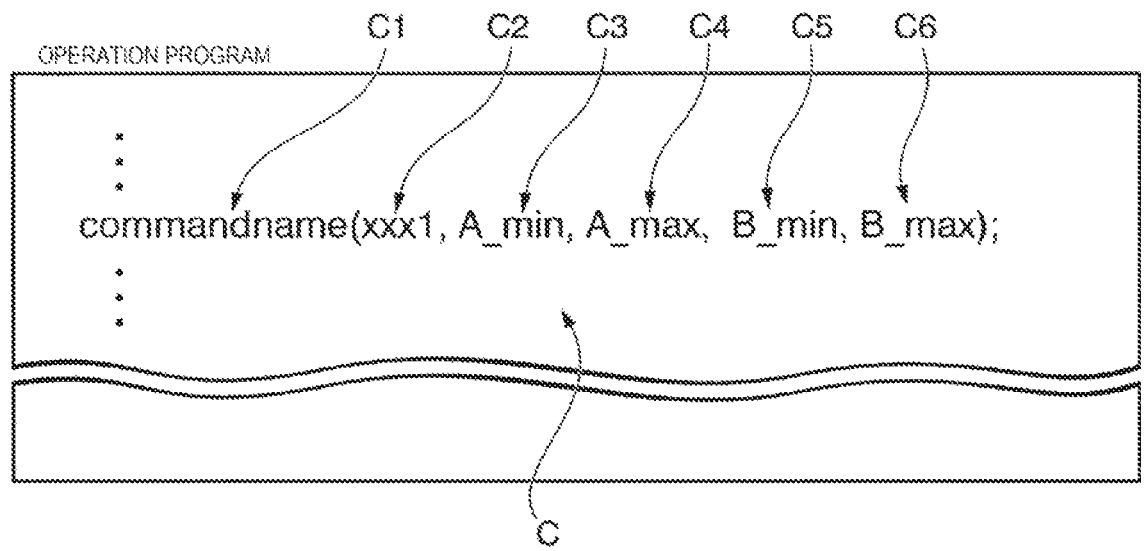
FIG. 8 is a diagram illustrating an example of a command included in an operation program executed by a robot control device.

In this example, the user can set (designate) one or more rotation prohibition ranges indicated by the command C in the robot control device 30 by writing a command C illustrated in FIG. 8 in the operation program. FIG. 8 is a diagram illustrating an example of the command C included in the operation program to be executed by the robot control device 30. The command C illustrated in FIG. 8 is an example of a command for setting the rotation prohibition range in the robot control device 30. In the example illustrated in FIG. 8, the command C sets two rotation prohibition ranges in the robot control device 30. A portion C1 indicated by "commandname" in portions included in the command C is a name indicating the command C. A portion C2 indicated by "xxx1" in the portions included in the command C is a portion for designating a robot to which the robot control device 30 limits the rotation range of the joint J4 and in this example, indicates identification information (for example, ID indicating the robot 20) for identifying the robot 20. A portion C3 indicated by "A_min" in the portions included in the command C is a portion for designating the minimum value of the first rotation prohibition range to the robot control device 30. In the command C, for example, the minimum value is designated by the rotation angle (that is, any of ±360 degrees) of the joint J4 in the positive direction or negative direction described above. A configuration in which the minimum value in the command C is designated by other information corresponding to the rotation angle of the joint J4 in the positive direction or the negative direction may be adopted. A portion C4 indicated by "A_max" in the portions included in the command C is a portion for designating the maximum value of the first rotation prohibition range to the robot control device 30. In the command C, for example, the maximum value is designated by the rotation angle (that is, any of ±360 degrees) of the joint J4 in the positive direction or the negative direction. The rotation angle designated by "A_max" is larger than the rotation angle indicated by "A_min". A configuration in which the maximum value in the command C is designated by other information corresponding to the rotation angle of the joint J4 in the positive direction or the negative direction may be adopted. A portion C5 indicated by "B_min" in the portions included in the command C is a portion for designating the minimum value of the second rotation prohibition range to the robot control device 30. In the command C, for example, the minimum value is designated by the rotation angle (that is, any of ±360 degrees) of joint J4 in the positive direction or the negative direction. A configuration in which the minimum value in the command C is designated by other information corresponding to the rotation angle of the joint J4 in the positive direction or the negative direction may be adopted. A portion C6 indicated by "B_max" in the portions included in the command C is a portion for designating the maximum value of the second rotation prohibition range to the robot control device 30. In the command C, for example, the maximum value is designated by the rotation angle (that is, any of ±360 degrees) of joint J4 in the positive direction or the negative direction. The rotation angle designated by "B_max" is larger than the rotation angle indicated by "B_min". A configuration in which the maximum value in the command C may be designated by other information corresponding to the rotation angle of the joint J4 in the positive direction or the negative direction may be adopted. Here, the robot control device 30 may have a configuration in which two rotation prohibition ranges can be set so that the first rotation prohibition range and the second rotation prohibition range overlap by the operation program. Or, the robot control device 30 may have a configuration in which two rotation prohibition ranges cannot be set in the robot control device 30 so that the first rotation prohibition range and the second rotation prohibition range overlap by the operation program.

In a case of executing commands included in a range enclosed by a head command and a tail command among a plurality of commands included in the operation program, the robot control device 30 may be configured to validate the rotation prohibition range set by the command C. The head command is a command for validating the rotation prohibition range. The tail command is a command for invalidating the rotation prohibition range. With this, the robot control device 30 can validate the rotation prohibition range in the case of executing the command representing an operation, which is desired by the user, out of the operations of the robot 20 among the commands included in the operation program and can invalidate the rotation prohibition range in the case of executing the command representing an operation, which is not desired by the user, out of the operations of the robot 20 among the commands included in the operation program. In a case where the rotation prohibition range is valid, when operating the robot 20, the robot control device 30 limits the rotation range of the joint J4 and operates the robot 20 so that the rotation angle of the joint J4 does not coincide with the rotation angle included in the rotation prohibition range. On the other hand, in a case where the rotation prohibition range is invalid, when operating the robot 20, the robot control device 30 does not limit the rotation range of the joint J4 and for example, operates the robot 20 so that an operation amount of the robot 20 is minimized. In this example, the operation amount is represented by the sum of magnitudes (absolute values) of the rotation angles of the joints J1 to J6. A configuration in which the operation amount is represented by another amount corresponding to the robot 20, instead of the sum of magnitudes, may be adopted.

The robot control device 30 may have a configuration in which validity and invalidity of the set rotation prohibition range can be changed for each command representing the operation of the robot 20 among the commands included in the operation program by using each of the command C, the head command, and the tail command. In this case, the robot control device 30 may be configured to be able to set different rotation prohibition ranges for each of the commands. Thus, the user can set different rotation prohibition ranges in the robot control device 30 for each operation of the robot 20.

Functional Configuration of Robot Control Device

Figure 9:
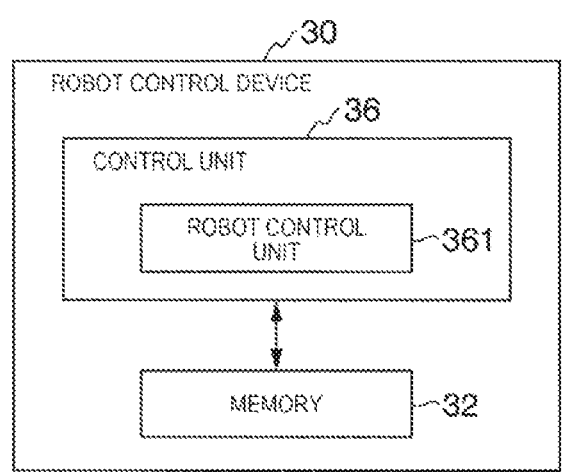
FIG. 9 is a diagram illustrating an example of a functional configuration of the robot control device.

In the following, a functional configuration of the robot control device 30 will be described with reference to FIG. 9. FIG. 9 is a diagram illustrating an example of a functional configuration of the robot control device 30.

The robot control device 30 includes a memory 32 and a control unit 36.

The control unit 36 controls the entire robot control device 30. The control unit 36 includes a robot control unit 361. The robot control unit 361 included in the control unit 36 are realized, for example, by executing various commands such as commands 321 and 322 stored in the memory 32 by the processor 31. Some or all of the functional units may be hardware functional units such as a large scale integration (LSI), an application specific integrated circuit (ASIC), and the like.

The robot control unit 361 reads an operation program stored in advance in the memory 32 from the memory 32. The robot control unit 361 operates the robot 20 based on the read operation program. Specific processing performed by the robot control unit 361 will be described with reference to FIG. 10.

Processing Performed by Robot Control Device

In the following, a flow of processing performed by the robot control device 30 will be described with reference to FIG. 10. FIG. 10 is a flowchart illustrating an example of a flow of processing to be performed by the robot control device 30.

The robot control unit 361 reads the operation program stored in advance in the memory 32 from the memory (step S110). In this example, in order to simplify the description, a case will be described in which the operation program includes only two kinds of commands of the command C and a teaching point designation command which is a command for designating a teaching point.

Next, the robot control unit 361 selects the commands included in the operation program one by one from the top based on the operation program read from the memory 32 in step S110 and repeatedly performs processing of steps S130 to S170 for the selected command (step S120).

After the command is selected in step S120, the robot control unit 361 determines whether or not the command selected in step S120 is the command C (step S130).

In a case where it is determined that the command selected in step S120 is the command C (YES in step S130), the robot control unit 361 sets the rotation prohibition range indicated by the command C selected in step S120 in the robot control device 30 (step S140). For example, the robot control unit 361 sets the rotation prohibition range in the robot control device 30 by storing information indicating the rotation prohibition range in the memory 32.

After processing of step S140 is performed, the robot control unit 361 makes a transition to step S120 and selects the next command. In a case where there is no unselected command in step S120, the robot control unit 361 ends processing.

On the other hand, in a case where it is determined that the command selected in step S120 is not the command C (NO in step S130), the robot control unit 361 determines that the command is a teaching point designation command and specifies the teaching point indicated by the command as a target teaching point for making the control point of the robot 20 coincide with the teaching point (step S150).

Next, the robot control unit 361 calculates the rotation angle of each of the joints J1 to J6 in a case where the control point of the robot 20 coincides with the teaching point, based on the teaching point identified in step S150 and inverse kinematics (step S160).

Next, the robot control unit 361 determines whether or not a rotation prohibition range is set in the robot control device 30. The robot control unit 361 operates the robot 20 based on the determination result and the rotation angle calculated in step S160, and causes the control point of the robot 20 to coincide with the teaching point specified in step S150 (step S170).

Specifically, in a case where information indicating the rotation prohibition range is stored in the memory 32, the robot control unit 361 determines that the rotation prohibition range is set in the robot control device 30. In this case, for example, in a case where the control point of the robot 20 is caused to coincide with the teaching point specified in step S150 by operating the robot 20 so that the amount of motion of the robot 20 is minimized, the robot control unit 361 determines whether or not the operation of the robot 20 is an operation including the first state. In a case where it is determined that the operation of the robot 20 is the operation including the first state, the robot control unit 361 operates the robot 20 so that the rotation angle included in the rotation prohibition range indicated by the information does not coincide with the rotation angle of the joint J4 and makes the control point of the robot 20 coincide with the teaching point specified in step S150. On the other hand, in a case where it is determined that the robot control unit 361 determines that the operation of the robot 20 is not the operation including the first state, the robot control unit 361 causes the robot 20 to operate so that the operation amount of the robot 20 is minimized and makes the control point of the robot 20 coincide with the teaching point.

On the other hand, in a case where information indicating the rotation prohibition range is not stored in the memory 32, the robot control unit 361 determines that the rotation prohibition range is not set in the robot control device 30. In this case, the robot control unit 361 causes the robot 20 to operate so that the operation amount of the robot 20 is minimized and makes the control point of the robot 20 coincide with the teaching point specified in step S150.

After processing of step S170 is performed, the robot control unit 361 makes a transition to step S120 and selects the next command. In a case where there is no unselected command in step S120, the robot control unit 361 ends processing.

The robot control device 30 described above may be configured by some or all of the plurality of information processing devices as illustrated in FIG. 11, instead of the information processing device PC1 including one processor 31 and one memory 32. FIG. 11 illustrates an example of a hardware configuration of the robot control device 30 in a case where the robot control device 30 is configured by a plurality of information processing devices.

Since the information processing device PC2 and the information processing device PC3 illustrated in FIG. 11 have the same configuration as the information processing device PC1, description thereof will be omitted.

In the example illustrated in FIG. 11, the information processing device PC1 and the information processing device PC2 are connected so as to be able to communicate with each other by wireless or wired communication. In this example, the information processing device PC1 and the information processing device PC3 are connected to each other via a local area network (LAN) so as to be able to communicate with each other by wireless or wired communication. In the example, the information processing device PC2 and the information processing device PC3 are connected via a LAN so as to be able to communicate with each other by wireless or wired communication.

In the example illustrated in FIG. 11, the robot control device 30 is configured with at least one of a processor 31, a processor 41, and a processors 51 and at least one of a memory 32, a memory 42, and a memory 52. In a case where the robot control device 30 is configured with two or more of the processor 31, the processor 41, and the processor 51, the two or more processors configuring the robot control device 30 cooperate to realize the function of the robot control device 30 by performing communication by the communication unit. In this case, the two or more processors execute processing by the function of the robot control device 30 based on the commands stored in at least one of the memory 32, the memory 42, and the memory 52.

As in the example illustrated in FIG. 11, in a case where the robot control device 30 is configured by a plurality of information processing devices, the robot control device 30 is communicably connected to at least one of the plurality of information processing devices.

The manipulator M may be configured so that the third arm L3 and the fourth arm L4 can overlap when viewed from the axial direction of the third rotation axis AX3. The manipulator M may be configured so that the fifth arm L5 and the sixth arm L6 can overlap when viewed from the axial direction of the fifth rotation axis AX5.

The second rotation axis AX2 and the third rotation axis AX3 may be non-parallel to each other. A configuration in which the third rotation axis AX3 and the fourth rotation axis AX4 intersect each other without being orthogonal to each other or does not intersect each other may be adopted. A configuration in which the fourth rotation axis AX4 and the fifth rotation axis AX5 intersect each other without being orthogonal to each other or do not intersect each other may be adopted. A configuration in which the fifth rotation axis AX5 and the sixth rotation axis AX6 intersect each other without being orthogonal to each other or do not intersect each other may be adopted.

As described above, the robot control device 30 can limit the rotation range (rotation range of the joint J4 in this example) of the C arm (in this example, fourth arm L4). With this, the robot control device 30 can suppress the interference between the object and the robot (in this example, the robot 20) due to the rotation of the C arm in the case where any object (in this example, object EC) is attached to the C arm.

Further, the robot control device 30 may limit the rotation range of the C arm in the operation including the first state and may be able not to limit the rotation range of the C arm in the operation not including the first state. With this, the robot control device 30 can suppress interference between the object and the robot accompanying the rotation of the C arm in the case where any object is attached to the C arm which is the rotation in the operation including the first state.

The robot control device 30 can set the rotation range of the C arm in the operation including the first state and the rotation range of the C arm in the operation not including the first state to be different rotation ranges. With this, the robot control device 30 sets the rotation range of the C-arm in the operation including the first state to a rotation range different from the rotation range of the C-arm in the operation not including the first state, so that it is possible to suppress the interference between the object and the robot accompanying the rotation of the C arm in a case where any object is attached to the C arm.

Although the embodiment of the invention has been described in detail with reference to the drawings, a specific configuration is not limited to this embodiment, and various modifications, substitutions, deletions, and the like may be made thereto without departing from the gist of the invention.

A program for realizing the function of any component in the device (for example, robot control device 30) described above may be recorded on a computer-readable recording medium and the program may be read and executed by a computer system. The "computer system" referred to here includes an operating system (OS) and hardware such as peripheral devices. The "computer-readable recording medium" refers to a storage device such as a flexible disk, a magneto-optical disk, a portable medium such as a ROM, a compact disk (CD)-ROM, and a hard disk built in a computer system. Furthermore, the "computer readable recording medium" refers to a recording medium holding the program for a certain period of time, like a volatile memory (RAM) inside the computer system which serves as a server or a client in a case where the program is transmitted via a network such as the Internet or a communication line such as a telephone line.

The above program may be transmitted from the computer system in which the program is stored in the storage device or the like to another computer system via a transmission medium or by a transmission wave in a transmission medium. Here, the "transmission medium" for transmitting a program refers to a medium having a function of transmitting information such as a network (communication network) such as the Internet and a communication channel (communication line) such as a telephone line. The program described above may be for realizing a portion of the functions described above. Furthermore, the program described above may be a so-called difference file (difference program) which can realize the function described above by a combination with the program already recorded in the computer system.

The entire disclosure of Japanese Patent Application No. 2017-182102, filed Sep. 22, 2017 is expressly incorporated by reference herein.

What is claimed is:

1. A robot control device that controls a robot including an A arm that is rotatable about an A rotation axis, a B arm that is provided so as to be rotatable around a B rotation axis with respect to the A arm and allowed to be brought into a first state overlapping with the A arm when viewed from an axial direction of the B rotation axis, a C arm that is provided so as to be rotatable around a C rotation axis which is an axial direction intersecting with an axial direction of the B rotation axis with respect to the B arm, the robot control device comprising:
   a processor that is configured to execute computer-executable instructions so as to control the robot,
   wherein the processor is configured to limit a rotation range of the C arm to suppress interference between an object and the B arm, when the B arm is in the first state and the processor is configured to provide unlimited rotation range of the C arm when the B arm is not in the first state, the object being attached to an outer surface of the C arm, and the processor being configured to limit the rotation range of the C arm by predetermined limits entered by a user.

2. The robot control device according to claim 1,
wherein the processor is configured to limit a rotation range of the C arm in an operation including a first state and does not limit the rotation range of the C arm in an operation not including the first state.

3. The robot control device according to claim 1,
wherein the processor is configured to set the rotation range of the C arm in the operation including the first state and the rotation range of the C arm in the operation not including the first state to be different rotation ranges.

4. The robot control device according to claim 2,
wherein the processor is configured to set the rotation range of the C arm in the operation including the first state and the rotation range of the C arm in the operation not including the first state to be different rotation ranges.

5. A robot comprising:
an A arm that is rotatable about an A rotation axis;
a B arm that is provided so as to be rotatable around a B rotation axis with respect to the A arm and allowed to be brought into a first state overlapping with the A arm when viewed from an axial direction of the B rotation axis; and
a C arm that is provided so as to be rotatable around a C rotation axis which is an axial direction intersecting with an axial direction of the B rotation axis with respect to the B arm,
wherein interference between an object and the B arm is suppressed by limiting a rotation range of the C arm by a processor when the B arm is in the first state, the rotation range of the C arm being limited by predetermined limits entered by a user, the rotation range of the C arm being unlimited when the B arm is not in the first state, and the object being attached to an outer surface of the C arm.

6. The robot according to claim 5,
wherein the processor is configured to limit a rotation range of the C arm in an operation including a first state and does not limit the rotation range of the C arm in an operation not including the first state.

7. The robot according to claim 5,
wherein the processor is configured to set the rotation range of the C arm in the operation including the first state and the rotation range of the C arm in the operation not including the first state to be different rotation ranges.

8. The robot according to claim 6,
wherein the processor is configured to set the rotation range of the C arm in the operation including the first state and the rotation range of the C arm in the operation not including the first state to be different rotation ranges.

9. A robot system comprising:
a robot that includes an A arm that is rotatable about an A rotation axis, a B arm that is provided so as to be rotatable around a B rotation axis with respect to the A arm and allowed to be brought into a first state overlapping with the A arm when viewed from an axial direction of the B rotation axis, a C arm that is provided so as to be rotatable around a C rotation axis which is an axial direction intersecting with an axial direction of the B rotation axis with respect to the B arm; and
a robot control device that includes a processor that is configured to execute computer-executable instructions so as to control the robot,
wherein the processor is configured to suppress interference between an object and the B arm by limiting a rotation range of the C arm when the B arm is in the first state, the processor being configured to limit the rotation range by predetermined limits entered by a user, the processor being configured to provide unlimited rotation range of the C arm when the B arm is not in the first state, and the object being attached to an outer surface of the C arm.

10. The robot control device according to claim 9,
wherein the processor is configured to limit a rotation range of the C arm in an operation including a first state and does not limit the rotation range of the C arm in an operation not including the first state.

11. The robot control device according to claim 9,
wherein the processor is configured to set the rotation range of the C arm in the operation including the first state and the rotation range of the C arm in the operation not including the first state to be different rotation ranges.

12. The robot control device according to claim 10,
wherein the processor is configured to set the rotation range of the C arm in the operation including the first state and the rotation range of the C arm in the operation not including the first state to be different rotation ranges.

* * * * *